United States Patent
Karsi et al.

(10) Patent No.: US 7,073,079 B1
(45) Date of Patent: Jul. 4, 2006

(54) METHOD, SYSTEM, AND APPARATUS TO APPLY PROTOCOL-DRIVEN POWER MANAGEMENT TO REDUCE POWER CONSUMPTION OF DIGITAL COMMUNICATION TRANSCEIVERS

(75) Inventors: Murat F. Karsi, Encinitas, CA (US); Hassan N. El-Ghoroury, Cardiff by the Sea, CA (US)

(73) Assignee: Ellipsis Digital Systems, Inc., Carlsbad, CA (US)

( * ) Notice: Subject to any disclaimer, the term of this patent is extended or adjusted under 35 U.S.C. 154(b) by 596 days.

(21) Appl. No.: 10/309,616

(22) Filed: Dec. 4, 2002

Related U.S. Application Data

(60) Provisional application No. 60/336,593, filed on Dec. 4, 2001.

(51) Int. Cl.
*G06F 1/32* (2006.01)
(52) U.S. Cl. .................. 713/320; 713/323; 713/324; 713/330
(58) Field of Classification Search ............... 713/320, 713/324, 327, 365, 574, 227, 544, 323
See application file for complete search history.

(56) References Cited

U.S. PATENT DOCUMENTS

| | | | | |
|---|---|---|---|---|
| 6,510,142 | B1 * | 1/2003 | Kinnavy et al. | 370/311 |
| 6,546,496 | B1 * | 4/2003 | Wang et al. | 713/322 |
| 6,618,814 | B1 * | 9/2003 | Gaur et al. | 713/323 |
| 6,745,049 | B1 * | 6/2004 | Uchida et al. | 455/560 |
| 6,904,290 | B1 * | 6/2005 | Palenius | 455/522 |

* cited by examiner

*Primary Examiner*—Thomas Lee
*Assistant Examiner*—Malcolm Cribbs
(74) *Attorney, Agent, or Firm*—Blakely, Sokoloff, Taylor & Zafman LLP

(57) ABSTRACT

According to one aspect of the invention, a system is provided which includes a transmitting node and one or more communication channels. The transmitting node includes one or more components to process data for transmission to a receiving node over the one or more communication channels. In one embodiment of the invention, the power consumption levels of one or more components in the transmitting node are determined based on data transmission rates supported by the transmitting node and data transmission rates supported by the one or more channels.

16 Claims, 3 Drawing Sheets

METHOD, SYSTEM, AND APPARATUS TO APPLY PROTOCOL-DRIVEN POWER MANAGEMENT TO REDUCE POWER CONSUMPTION OF DIGITAL COMMUNICATION TRANSCEIVERS

CROSS REFERENCE TO RELATED APPLICATIONS

This non-provisional United States (US) patent application claims the benefit of U.S. Provisional Application No. 60/336,593 filed on Dec. 4, 2001, by inventors Murat F. Karsi et al. entitled "Method, System, and Apparatus to Apply Protocol-Driven Power Management to Reduce Power Consumption of Digital Communication Transceivers."

FIELD OF THE INVENTION

The present invention relates to a method, system, and apparatus to apply protocol-driven power management to reduce power consumption of digital communication transceivers.

BACKGROUND OF THE INVENTION

The attractiveness of a wireless communication products such as cellular phones or WLAN transceivers can be closely linked with the length of time the device can operate between battery recharges. In order to improve the battery life between recharges, it is necessary to reduce the power consumption of the product. As a result, a factor that contributes to the success of a consumer communication product is its power consumption.

Performance and features of communication products constantly increase. As a result, required functionality and complexity of such products are seen to steadily increase in time. Increased functionality and complexity lead to higher power consumption. As a result, there is need for continuing improvements in reducing product power consumption. Several techniques are currently available for reducing the power consumption of communication products. One of the techniques involves managing power consumption by turning off the power of unused system components, or by reducing the clocking rate of those unused system components. For example, controlling the power or clock rates of transceiver system components (such as MAC, PHY, Radio, and PA) has been used. However, such power management techniques may not be effective. Two of the reasons limiting the effectiveness of such techniques are described below.

First, power management by controlling the powering or clocking of system components may not be suitable and may yield inefficient results when applied to certain transceiver architectures. For example, Digital Signal Processor (DSP) based transceivers have a large power consumption processor core that is always kept running even if the processor is idle or there are reduced computational requirements. Therefore, managing power consumption of DSP based transceiver can be very complicated and can essentially yield low efficiency (as it may not be possible to turn off or reduced the clock rate of processor components).

Second, some simple power management techniques are known to yield power consumption reduction. These simple techniques can include turning the receiver strip when the transmitter is being used. However, the performance of such simple techniques is limited since they generally do not utilize knowledge of communication protocol, transceiver architecture, host data rate, and available date of a communication channel.

As such, it would be highly desirable to provide a method, system, and apparatus to reduce power consumption of digital communication transceivers.

DETAILED DESCRIPTION OF THE INVENTION

The present invention relates to a method, system, and apparatus to apply protocol-driven power management to reduce power consumption of digital communication transceivers.

A. General Description

The method, system, and apparatus in accordance with the present invention generally involve reducing the power consumption of unused system blocks by turning their power off or reducing their clocking rate. Furthermore, the method, system, and apparatus can involve extending the time intervals during which the power to system blocks can be turned off or the clock frequency of these system blocks can be reduced. The method, system, and apparatus can extend such time intervals generally by choosing appropriate data transmission rates among available rates provided by the communication protocol. Furthermore, the method, system, and apparatus in accordance with the present invention can utilize knowledge of the communication protocol, host data rate and available channel data rate of the channel to efficiently reduce power consumption. It should be noted that the method, system, and apparatus could be applied to transceivers with architecture having the capability of powering and clocking individual system blocks independently.

B. System Model

Figure 1:
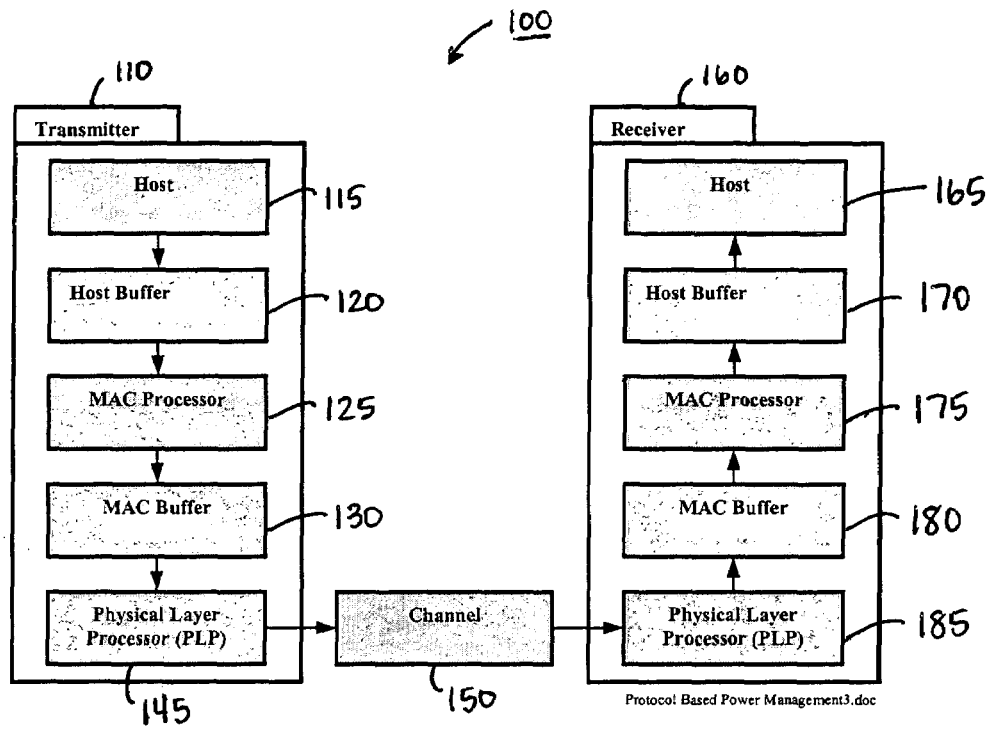
FIG. 1 is a block diagram illustrating a signal flow model of an exemplary communication transceiver.
Figure 2:
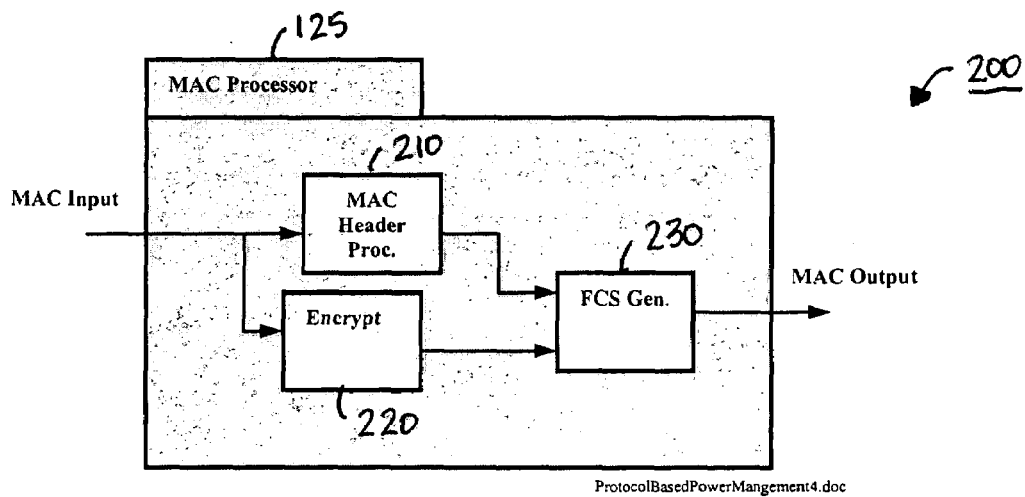
FIG. 2 is a block diagram of an exemplary transmitter MAC processor for 802.11a WLAN.

FIG. 1 shows the signal flow model of an exemplary communications transceiver 100. FIG. 2 is a block diagram of an exemplary transmitter MAC processor for 802.11a WLAN.

As shown in FIG. 1, the Host (e.g., host 115) at the transceiver represents an information source, and writes generated information to a Host Buffer (e.g., host buffer 120). Host Buffer is essentially a memory that stores the information generated by the Host. The information is than read by the Medium Access Controller (MAC) (e.g., MAC 125) and processed. For a typical application, such as an 802.11a Wireless Local Area Network (WLAN), the MAC processing includes generation of an appropriate header 210, data encryption 220 and a Frame Check Sum (FCS) 230 (as shown in FIG. 2). Upon completion of MAC processing, data is written to the MAC Buffer 130. The transmitter physical layer processor (PLP) 145 reads the data stored in the MAC buffer and processes the data and transmits a signal waveform over the channel 150.

At the receiver 160, the signal waveform is received by the PLP 185. After completion of PLP processing, the information is written to the MAC Buffer 180. The signal is read by the MAC 175 and then processed in the MAC. The MAC processing in the receiver involves reversing the processing in the transmitter MAC and calculating the FCS.

Upon completion of MAC processing, the output is written to the Host Buffer 170. The target Host 165 then reads the Host Buffer and uses the data.

As shown in FIG. 1, MAC Buffers between the PLP and MAC processors, and Host Buffers between the Host and MAC processors facilitates independent operation of Host, MAC processor, and PLP. For example, during transmission, MAC processor can be turned off after the MAC Processor finish writing its output to the MAC Buffer. After the Mac Processor had finished writing its output to the MAC Buffer, the PLP can read the MAC buffer and transmit the information over the channel. As such, the MAC buffer facilitates independent operation of the MAC processor and the PLP.

In one embodiment, the method, system, and apparatus in accordance with the present invention can reduce or save power consumption through utilization of MAC Buffers, Host Buffers, and various data transmission rates supported by the communication protocol. In this embodiment, the method, system, and apparatus can reduce or save power consumption by having the MAC processor operating as fast as possible for a given scenario of Host and supported channel rates. The method, system, and apparatus can further reduce or save power consumption by transmitting at channel rates higher than the required host rate. Since the time required for transmission is less with high data rates, the system can operate a reduced duty cycles thus yielding reduction in power consumption.

Exemplary operating scenarios will be discussed below. These exemplary scenarios can include a scenario where the Host Data Rate is greater than (>) the Supported Channel Data Rate, a scenario where the Host Data Rate equals (=) the Supported Channel Data Rate, and a scenario where the Host Data Rate is less than (<) the Supported Channel Data Rate.

Scenario where the Host Data Rate is Greater Than (>) the Supported Channel Data Rate If the Host data rate is greater than (>) the data rate that the channel can support, additional time is required for transmission of a given data block over the channel than the time interval needed to generate the given data block. Thus, the channel may not be able to accommodate continuous data transmission from the Host. However, if the Host generates or produces data blocks in bursts, it is possible to write the data blocks to the Host Buffer. MAC processor and PLP would continue processing the data blocks after the Host finishes generating or producing data. As such, although the MAC processor and PLP would require additional processing time due to slower processing, it would then be possible to accommodate the Host data rate.

During the time interval in which the Host had finished writing one or more data blocks to the Host Buffer and the MAC Processor and the PLP are processing the one or more blocks writing to the Host Buffer, Host circuitry that is in idle state can go to a Low Power Consumption (LPC) Mode. This is typically accomplished either by reducing the supply voltage, current, or clock frequency, or by turning off the power to the Host circuitry involved with generating or producing the one or more data blocks written to the Host Buffer.

Furthermore, the MAC Processor can operate at the same rate as the Host and can go to LPC Mode while the PLP continues to transmit at the supported channel data rate. As such, power savings for MAC operations can also be realized.

Scenario where the Host Data Rate Equals (=) the Supported Channel Data Rate

If the Host data rate is equal to the data rate that the channel can support, the channel can accommodate continuous transmission from the Host. Data could be transmitted over the channel at the same rate as the Host could generate or produce data.

Scenario where the Host Data Rate is Less Than (<) the Supported Channel Data Rate If the data rate requested by the Host is less than the data rate that can be supported by the channel, the channel can accommodate continuous transmission from the Host. Furthermore, by transmission through the channel at a higher rate, thus complete the transmission through the channel during a smaller time interval. Since, the time interval that some the transmitter components are expected to function is reduced, these components may go to LPC mode for during their idle time intervals. As a result, power consumption is reduced. For example, if the Host Buffer is can be emptied by the MAC processor at a higher rate than the generation of data by the Host (because of faster transmission through the channel relative to Host data generation rate), MAC processor and PLP can be switched to a LPC mode while the Host Buffer is being filled by the Host. MAC processor and PLP can then start processing at a predetermined time delay relative to the starting time of filling of the Host Buffer. The relative delay can be determined by examining the Host Data Rate and Supported Channel Data Rate.

It should be noted that choices of supported channel data rate could be limited by various factors. Exemplary factors, among others, that can affect supported channel data rates may include:

1. Communication standards typically offer a known, finite set of possible communication speeds.

2. Transmission capability of the transmission medium depends on factors such as multi-path fading, interference, and the distance between transceiver pairs.

3. Network may be set up to operate at low data rates to reduce power consumption of mobile units. As a result the set of allowed data rates could be limited to a predetermined set of lower data rates. Typical WLANs would provide configurable or selectable data rates so that tradeoffs between transmission speed and power consumption can be made. For example, a typical WLAN could offer multiple data rates having different power consumption requirements for given levels of service quality. It should be noted that although it is possible to communicate with lower data rates to reduce power consumption, the transceiver system components would have to operate for longer time durations, and could thus decrease the level of power consumption reduction or savings.

D. Exemplary Application to a Wireless Local Area Network

As an example, an application of the method, system, and apparatus in accordance with the present invention to a typical 802.11a wireless local area network (WLAN) will be provided and described below. It should be noted that data rates of 6, 9, 12, 18, 24, 36, 48 and 54 Mbits/sec are typically offered in a standard 802.11a wireless local area network (WLAN).

Figure 3:
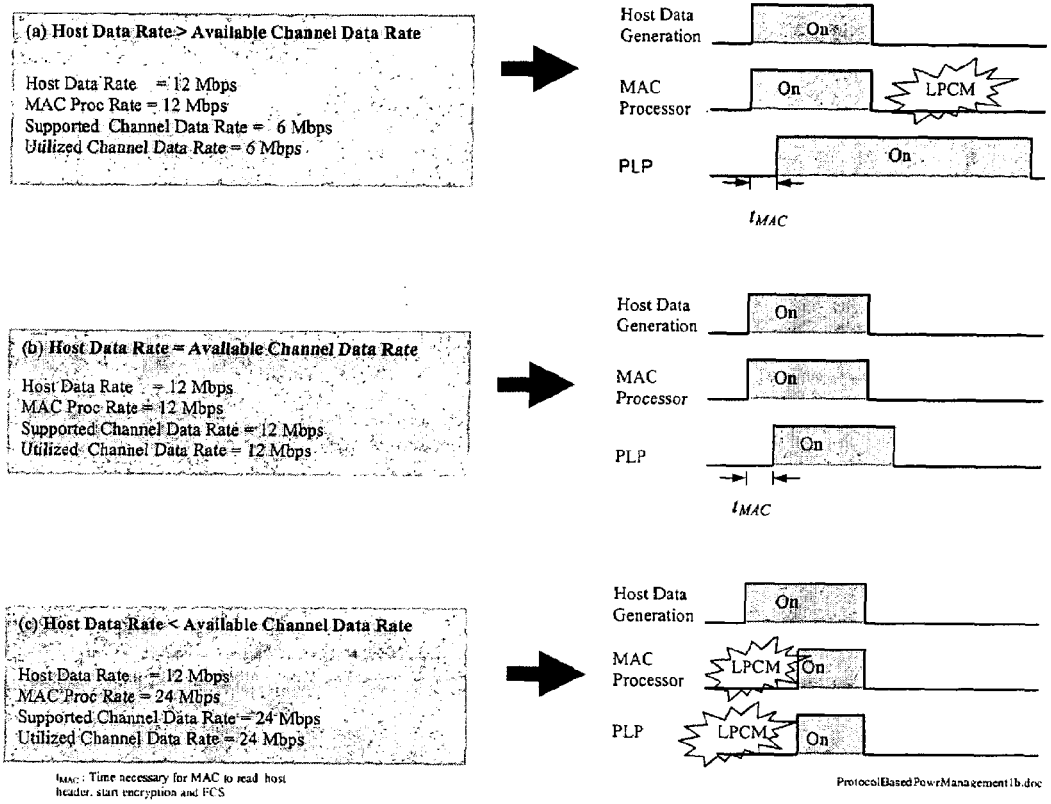
FIG. 3 shows exemplary illustration of the Protocol Driven Power Management with 802.11a WLAN data rates.

FIG. 3 shows exemplary illustrations of required time intervals of operation for Host, MAC processor and PLP for Host data rate of 12 Mbits/sec and supported channel data rates of 6, 12, and 24 Mbits/sec. The exemplary illustrations of FIG. 3 generally provide visual approximations of time intervals required to process data at given processing rates of the system component.

FIG. 3 shows three exemplary illustrations for three exemplary operating scenarios, including a scenario where the Host Data Rate is greater than (>) the Supported Channel Data Rate, a scenario where the Host Data Rate equals (=) the Supported Channel Data Rate, and a scenario where the Host Data Rate is less than (<) the Supported Channel Data Rate.

The exemplary operating scenario where the Host Data Rate is greater than (>) the Supported Channel Data Rate will now be discussed. In this operating scenario, assume that the Host Data Rate can be 12 Mbps, the MAC Processing Rate can be 12 Mbps, the Supported Channel Data Rate can be 6 Mbps, and the Utilized Channel Data Rate can be 6 Mbps.

As can be seen in from FIG. 3, the Host and MAC function at the Host data rate of 12 Mbits/sec. When the writing of the processed data block to the MAC Buffer is finished, the Host and the MAC Processor can go to a LPC mode (LPCM). PLP can continue transmitting at 6 Mbits/sec until it empties the contents of the MAC buffer.

It should be noted that the MAC processor is assumed to function at the higher data rate 12 Mbits/sec. This assumption is reasonable because the MAC processor is capable of operating at all the speeds requested by the communications protocol. It should further be noted that $t_{MAC}$ refers to the time it needed for the Host Header to be written to the Host Buffer. As it needs the Host Header to start its operation, the MAC processor can start writing to the MAC Buffer after the Host Header has been written to the Host Buffer.

The exemplary operating scenario where the Host Data Rate is equal to (=) the Supported Channel Data Rate will now be discussed. In this operating scenario, assume that the Host Data Rate can be 12 Mbps, the MAC Processing Rate can be 12 Mbps, the Supported Channel Data Rate can be 12 Mbps, and the Utilized Channel Data Rate can be 12 Mbps. Host, MAC processor, and PLP can function at 12 Mbits/sec.

The exemplary operating scenario where the Host Data Rate is less than (<) the Supported Channel Data Rate will now be discussed. In this operating scenario, assume that the Host Data Rate can be 12 Mbps, the MAC Processing Rate can be 24 Mbps, the Supported Channel Data Rate can be 24 Mbps, and the Utilized Channel Data Rate can be 24 Mbps.

As the Supported Channel Data Rate is greater than the Host Data Rate, the MAC Processor and the PLP need to process data for a shorter amount of time relative to Host. Thus, MAC Processor and PLP can be in the LPC mode (LPCM) for part of the time interval where Host continues to generate data. As shown in FIG. 3, the MAC Processor and the PLP are in the LPC Mode while the Host is generating data and filling the Host Buffer with the generated data. At a predetermined time, the MAC Processor and the PLP would begin processing data. Upon finishing processing data, the MAC Processor and the PLP should go back to LPC mode.

In one embodiment, the method, system, and apparatus to reduce power consumption in accordance with the present invention can be controlled from within the MAC layer, controlled by the Host processor, or controlled by a separate processing block.

Figure 4:
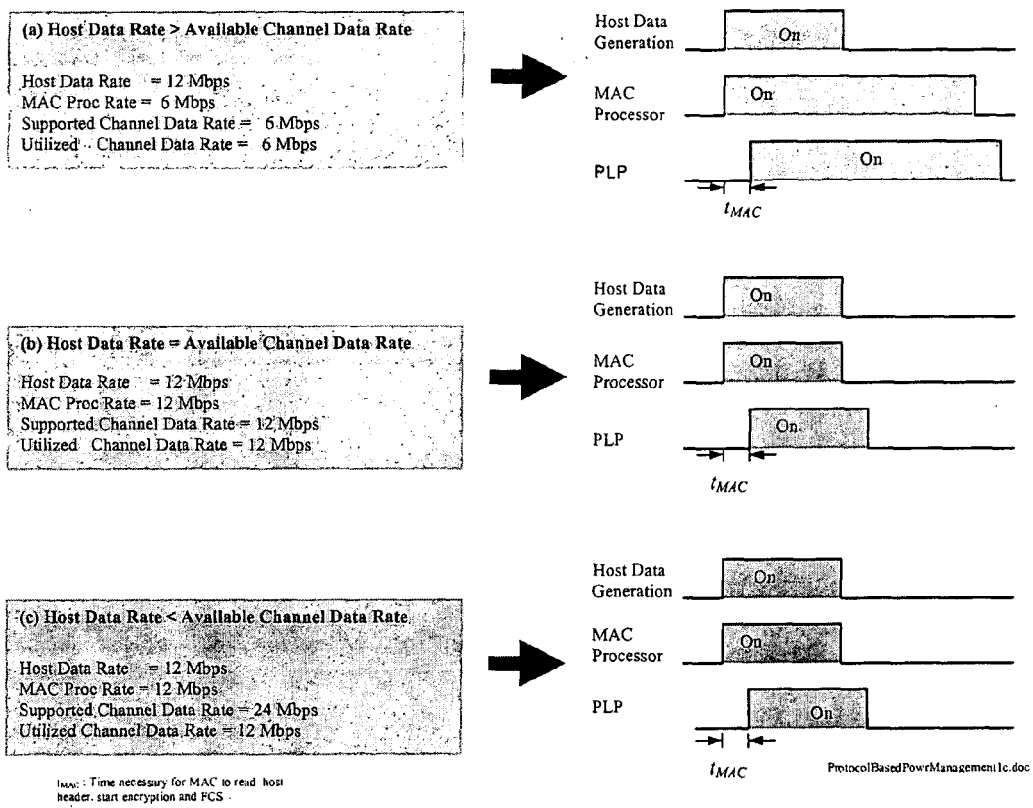
FIG. 4 is exemplary illustration showing utilization of system component blocks without the Protocol Driven Power Management.

FIG. 4 shows an exemplary utilization of system component blocks without the Protocol Driven Power Management. It should be noted that the system component blocks would continue functioning and processing during the time intervals that they would be in LPC Mode if the Protocol Driven Power Management had been implemented.

E. Performance Analysis

Exemplary performance analysis of the application of Protocol Driven Power Management was performed. During the performance analysis, transfer of maximum length packets (i.e., 2304 Bytes) was assumed. The duration for which the MAC and PLP are assumed to be in the "On" state relative to the time necessary for transmission of the packets was calculated for each possible pairs of Host data rate and supported channel data rate. Reduction of power consumption over all pairs of Host data rate and supported channel data rates was averaged to obtain the average performance over all Host data rates and channel conditions.

Tables 2 through 9 are spread sheets showing exemplary performance analysis for Host Data Rates 6, 9, 12, 18, 24, 36, 48 and 54 Mbits/sec respectively. In each of the spreadsheets, for a given Host data rate, supported channel rates of 6, 9, 12, 18, 24, 36, 48 and 54 Mbits/sec is analyzed. The average performance over all Host rates and supported channel data rates in the last column of Table 2.

For comparison purposes, exemplary performance results were also obtained when Protocol Driver Power Management was not applied to system components. Tables 10 through 17 are spread sheets showing exemplary performance analysis for Host data rates 6, 9, 12, 18, 24, 36, 48 and 54 Mbits/sec respectively. In each of the spreadsheets, for a given Host data rate, supported channel rates of 6, 9, 12, 18, 24, 36, 48 and 54 Mbits/sec are analyzed. The average performance over all Host rates and supported channel data rates is shown in the last column of Table 10.

It should be noted that the performance analysis incorporates the following aspects of the communication protocol:

1. Header and Signal fields of a 802.11 packet.
2. Convolutional Coding process.
3. Acknowledgement procedure of 802.11a MAC. The time interval for the receiver to stay "On" for reception of an Acknowledgement is incorporated.
4. MAC Encryption and header calculation.

Performance Results

Table 1 shows exemplary performance results from applying the Protocol Based Power Management in comparison to not applying the Protocol Based Power Management. It should be noted that the performance results are extracted from the last column of Table 2 and Table 10.

TABLE 1

Performance results with and without the application of the Protocol Based Power Management.

| System Component | | Relative "On" Time With the Protocol Based Power Management | Relative "On" Time Without the Protocol Based Power Management |
|---|---|---|---|
| Transmit | MAC Tx | 47 | 95.125 |
| | PLP Tx | 72.125 | 96.75 |
| | PLP Rx | 3.375 | 3.25 |
| Receive | PLP Rx | 72.125 | 96.75 |
| | PLP Tx | 3.375 | 3.25 |
| | MAC Rx | 47 | 95.125 |

As shown in Table 1, application of the Protocol Based Power Management could reduce the "On" time of the system component significantly. The reduction of the "On" time could lead to reduction in power consumption as the System Components would be switched to LPC mode during the time intervals when they are not "On".

Performance Analysis Spread Sheets

TABLE 2

Exemplary System Component Utilization - With Application of Protocol Driven Power Management, Host Data Rate = 6 Mbits/sec. Overall performance average over all Host data rates are shown in the last column.
System Component Utilization Analysis With Protocol Driven Power Management
Last Update on 11/08/2001

Transmitting Station

| | | | | | | | | | | |
|---|---|---|---|---|---|---|---|---|---|---|
| Maximum Message Length in Bytes | 2304 | 2304 | 2304 | 2304 | 2304 | 2304 | 2304 | 2304 | | |
| ($D_g$) Host Data Rate Mbits/sec | 6 | 6 | 6 | 6 | 6 | 6 | 6 | 6 | | |
| ($T_{health}$) Time to Fill MACTx in Buffer in micro | 3072 | 3072 | 3072 | 3072 | 3072 | 3072 | 3072 | 3072 | | |
| MAC Encryption Overhead in Bytes | 8 | 8 | 8 | 8 | 8 | 8 | 8 | 8 | | |
| MAC Header in Bytes (including FCS) | 34 | 34 | 34 | 34 | 34 | 34 | 34 | 34 | | |
| Message and header Length | 2346 | 2346 | 2346 | 2346 | 2346 | 2346 | 2346 | 2346 | | |
| ($M_R$) MAC Data Rate in Mbits/second | 6 | 9 | 12 | 18 | 24 | 36 | 48 | 54 | | |
| ($T_{ACKT}$) MAC Processing time in micro second | 3126 | 2085 | 1564 | 1043 | 782 | 521 | 391 | 348 | | |
| ($P_R$) PHY Data Rate in Mbits/Second | 6 | 9 | 12 | 18 | 24 | 36 | 48 | 54 | | |
| PHY Bytes per symbol | 3 | 4.5 | 6 | 9 | 12 | 18 | 24 | 27 | | |
| PHY Symbols for Message | 782 | 521 | 391 | 261 | 196 | 130 | 98 | 87 | | |
| PHY Message Preamble in micro seconds | 16 | 16 | 16 | 16 | 16 | 16 | 16 | 16 | | |
| PHY Message Signal in micro seconds | 4 | 4 | 4 | 4 | 4 | 4 | 4 | 4 | | |
| ($T_{ACKT}$) PHY Message Tx time in micro seconds | 3148 | 2104 | 1584 | 1064 | 804 | 540 | 412 | 368 | | |
| ($T_{ACKT}$) PHYRx Ack reception | 40 | 40 | 40 | 40 | 40 | 40 | 40 | 40 | | |
| ($T_{PHDtwhy}$) Message Delivery time including A | 3188 | 2144 | 1824 | 1104 | 844 | 560 | 452 | 408 | | |

Receiving Station

| | | | | | | | | | | |
|---|---|---|---|---|---|---|---|---|---|---|
| ($T_{ghyrx}$) PHY Message Rx time in micro seconds | 3148 | 2104 | 1584 | 1064 | 804 | 540 | 412 | 368 | | |
| Ack Preparation delay in micro seconds | 16 | 16 | 16 | 16 | 16 | 16 | 16 | 16 | | |
| Ack Length (16 + 4 + 4) micro seconds | 24 | 24 | 24 | 24 | 24 | 24 | 24 | 24 | | |
| ($T_{ACKTs}$) PHY Ack transmission | 40 | 40 | 40 | 40 | 40 | 40 | 40 | 40 | | |
| Time to Fill MACTx in Buffer in micro-sec | 3072 | 3072 | 3072 | 3072 | 3072 | 3072 | 3072 | 3072 | | |
| MAC Processing time in micro seconds | 3128 | 2085 | 1564 | 1043 | 782 | 521 | 391 | 348 | | |
| Message Delivery time including Ack | 3186 | 2144 | 1624 | 1104 | 844 | 580 | 452 | 406 | | |
| MAC and PHY Times | 3186 | 2144 | 1624 | 1104 | 844 | 580 | 452 | 406 | | |
| Total Message Delivery | 3186 | 3072 | 3072 | 3072 | 3072 | 3072 | 3072 | 3072 | | |
| (Sending) MACTx ON Percentage | 98 | 68 | 51 | 34 | 25 | 17 | 13 | 11 | 40 | 47 |
| (Sending) PHY Tx ON Percentage | 99 | 68 | 52 | 35 | 26 | 18 | 13 | 12 | 40 | 72.125 |
| (Sending) PHY Rx ON Percentage | 1 | 1 | 1 | 1 | 1 | 1 | 1 | 1 | 1 | 3.375 |
| (Receiving) PHY Rx On Time | 99 | 68 | 52 | 35 | 26 | 18 | 13 | 12 | 40 | 72.125 |
| (Receiving) PHY Tx ON Percentage | 1 | 1 | 1 | 1 | 1 | 1 | 1 | 1 | 1 | 3.375 |
| (Receiving) MAC Rx On Percentage | 98 | 68 | 51 | 34 | 25 | 17 | 13 | 11 | 40 | 47 |
| | | | | | | | | | Avg | TotalAvg |

TABLE 3

Exemplary System Component Utilization - Without Application of Protocol Driven Power Management, Host Data Rate = 9 Mbits/sec Transmitting Station

| | | | | | | | | |
|---|---|---|---|---|---|---|---|---|
| Maximum Message Length in Bytes | 2304 | 2304 | 2304 | 2304 | 2304 | 2304 | 2304 | 2304 |
| ($D_R$) Host Data Rate Mbits/sec | 9 | 9 | 9 | 9 | 9 | 9 | 9 | 9 |
| ($T_{hostin}$) Time to Fill MACTx in Buffer in micro-sec | 2048 | 2048 | 2048 | 2048 | 2048 | 2048 | 2048 | 2048 |
| MAC Encryption Overhead in Bytes | 8 | 8 | 8 | 8 | 8 | 8 | 8 | 8 |
| MAC Header in Bytes (including FCS) | 34 | 34 | 34 | 34 | 34 | 34 | 34 | 34 |
| Message and header Length | 2346 | 2346 | 2346 | 2346 | 2346 | 2346 | 2346 | 2346 |
| ($M_R$) MAC Data Rate in Mbits/second | 9 | 9 | 12 | 18 | 24 | 36 | 48 | 54 |
| ($T_{mactx}$) MAC Processing time in micro seconds | 2085 | 2085 | 1564 | 1043 | 782 | 521 | 391 | 348 |
| ($P_R$) PHY Data Rate in Mbits/Second | 6 | 9 | 12 | 18 | 24 | 38 | 48 | 54 |
| PHY Bytes per symbol | 3 | 4.5 | 6 | 9 | 12 | 18 | 24 | 27 |
| PHY Symbols for Message | 782 | 521 | 391 | 261 | 196 | 130 | 98 | 87 |
| PHY Message Preamble in micro seconds | 16 | 16 | 16 | 16 | 16 | 16 | 16 | 16 |
| PHY Message Signal in micro seconds | 4 | 4 | 4 | 4 | 4 | 4 | 4 | 4 |
| ($T_{phytx}$) PHY Message Tx time in micro seconds | 3148 | 2104 | 1584 | 1064 | 804 | 580 | 412 | 368 |
| ($T_{ACKRx}$) PHYRx Ack reception | 40 | 40 | 40 | 40 | 40 | 40 | 40 | 40 |
| ($T_{PHDelivery}$) Message Delivery time including Ack | 3188 | 2144 | 1624 | 1104 | 844 | 580 | 452 | 408 |

Receiving Station

| | | | | | | | | |
|---|---|---|---|---|---|---|---|---|
| ($T_{phyrx}$) PHY Message Rx time in micro seconds | 3148 | 2104 | 1584 | 1064 | 804 | 540 | 412 | 368 |
| Ack Preparation delay in micro seconds | 16 | 16 | 16 | 16 | 16 | 16 | 16 | 16 |
| Ack Length (16 + 4 + 4) micro seconds | 24 | 24 | 24 | 24 | 24 | 24 | 24 | 24 |
| ($T_{ACKTx}$) PHY Ack transmission | 40 | 40 | 40 | 40 | 40 | 40 | 40 | 40 |
| Time to Fill MACTx in Buffer in micro-sec | 2048 | 2048 | 2048 | 2048 | 2048 | 2048 | 2048 | 2048 |
| MAC Processing time in micro seconds | 2085 | 2085 | 1564 | 1043 | 782 | 521 | 391 | 348 |

TABLE 3-continued

Exemplary System Component Utilization - Without Application of Protocol Driven Power Management, Host Data Rate = 9 Mbits/sec

| | | | | | | | | | |
|---|---|---|---|---|---|---|---|---|---|
| Message Delivery time including Ack | 2085 | 2085 | 2048 | 2048 | 2048 | 2048 | 2048 | 2048 | |
| MAC and PHY Times | 4170 | 4170 | 3612 | 3091 | 2830 | 2569 | 2438 | 2396 | |
| Total Message Delivery | 4170 | 4170 | 3612 | 3091 | 2830 | 2569 | 2439 | 2396 | |
| (Sending) MACTx ON Percentage | 50 | 50 | 43 | 34 | 28 | 20 | 16 | 15 | 32 |
| (Sending) PHY Tx ON Percentage | 75 | 50 | 44 | 34 | 28 | 21 | 17 | 15 | 36 |
| (Sending) PHY Rx ON Percentage | 1 | 1 | 1 | 1 | 1 | 2 | 2 | 2 | 1 |
| (Receiving) PHY Rx On Time | 75 | 50 | 44 | 34 | 28 | 21 | 17 | 15 | 36 |
| (Receiving) PHY Tx ON Percentage | 1 | 1 | 1 | 1 | 1 | 2 | 2 | 2 | 1 |
| (Receiving) MAC Rx On Percentage | 50 | 50 | 43 | 34 | 28 | 20 | 16 | 15 | 32 |

TABLE 4

Exemplary System Component Utilization - With Application of Protocol Driven Power Management, Host Data Rate = 12 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| ($D_R$) Host Data Rate Mbits/sec | 12 | 12 | 12 | 12 | 12 | 12 | 12 | 12 | |
| ($T_{hostin}$) Time to Fill MACTx in Buffer in micro-sec | 1536 | 1536 | 1536 | 1536 | 1536 | 1536 | 1536 | 1536 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| ($M_R$) MAC Data Rate in Mbits/second | 12 | 12 | 12 | 18 | 24 | 36 | 48 | 54 | |
| ($T_{mactx}$) MAC Processing time in micro seconds | 1564 | 1564 | 1564 | 1043 | 782 | 521 | 391 | 348 | |
| ($P_R$) PHY Data Rate in Mbits/Second | 6 | 9 | 12 | 18 | 24 | 36 | 48 | 54 | |
| PHY Bytes per symbol | 3 | 4.5 | 6 | 9 | 12 | 18 | 24 | 27 | |
| PHY Symbols for Message | 782 | 521 | 391 | 261 | 196 | 130 | 96 | 87 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| ($T_{phytx}$) PHY Message Tx time in micro seconds | 3148 | 2104 | 1564 | 1064 | 804 | 504 | 412 | 368 | |
| ($T_{ACKRx}$) PHYRx Ack reception | 40 | 40 | 40 | 40 | 40 | 40 | 40 | 40 | |
| ($T_{PHDelivery}$) Message Delivery time including Ack | 3188 | 2144 | 1624 | 1104 | 844 | 580 | 452 | 408 | |

Receiving Station

| | | | | | | | | | |
|---|---|---|---|---|---|---|---|---|---|
| ($T_{phyrx}$) PHY Message Rx time in micro seconds | 3148 | 2104 | 1584 | 1064 | 804 | 540 | 412 | 368 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| ($T_{ACKTx}$) PHY Ack transmission | 40 | 40 | 40 | 40 | 40 | 40 | 40 | 40 | |
| Time to Fill MACTx in Buffer in micro-sec | 1536 | 1536 | 1536 | 1536 | 1536 | 1536 | 1536 | 1536 | |
| MAC Processing time in micro seconds | 1564 | 1564 | 1564 | 1043 | 782 | 521 | 391 | 348 | |
| Message Delivery time including Ack | 3188 | 2144 | 1624 | 1104 | 844 | 580 | 452 | 408 | |
| MAC and PHY Times | 3188 | 2144 | 1624 | 1104 | 844 | 580 | 452 | 408 | |
| Total Message Delivery | 3188 | 2144 | 1624 | 1536 | 1536 | 1536 | 1536 | 1536 | |
| (Sending) MACTx ON Percentage | 49 | 73 | 96 | 68 | 51 | 34 | 25 | 23 | 52 |
| (Sending) PHY Tx ON Percentage | 99 | 98 | 98 | 68 | 52 | 35 | 27 | 24 | 63 |
| (Sending) PHY Rx ON Percentage | 1 | 2 | 2 | 3 | 3 | 3 | 3 | 3 | 3 |
| (Receiving) PHY Rx On Time | 99 | 98 | 98 | 89 | 52 | 35 | 27 | 24 | 63 |
| (Receiving) PHY Tx ON Percentage | 1 | 2 | 2 | 3 | 3 | 3 | 3 | 3 | 3 |
| (Receiving) MAC Rx On Percentage | 49 | 73 | 96 | 68 | 51 | 34 | 25 | 23 | 52 |

TABLE 5

Exemplary System Component Utilization - With Application of Protocol Driven Power Management, Host Data Rate = 18 Mbits/sec Transmitting Station

| | | | | | | | | |
|---|---|---|---|---|---|---|---|---|
| Maximum Message Length in Bytes | 2304 | 2304 | 2304 | 2304 | 2304 | 2304 | 2304 | 2304 |
| (DR) Host Data Rate Mbits/sec | 18 | 18 | 18 | 18 | 18 | 18 | 18 | 18 |
| (Thostin) Time to Fill MACTx in Buffer in micro-sec | 1024 | 1024 | 1024 | 1024 | 1024 | 1024 | 1024 | 1024 |
| MAC Encryption Overhead in Bytes | 8 | 8 | 8 | 8 | 8 | 8 | 8 | 8 |
| MAC Header in Bytes (including FCS) | 34 | 34 | 34 | 34 | 34 | 34 | 34 | 34 |
| Message and header Length | 2346 | 2346 | 2346 | 2346 | 2346 | 2346 | 2346 | 2346 |
| (MR) MAC Data Rate in Mbits/second | 18 | 18 | 18 | 18 | 24 | 36 | 48 | 54 |
| (Tmactx) MAC Processing time in micro seconds | 1043 | 1043 | 1043 | 1043 | 782 | 521 | 391 | 348 |
| (PR) PHY Data Rate in Mbits/Second | 6 | 8 | 12 | 18 | 24 | 36 | 48 | 54 |
| PHY Bytes per symbol | 3 | 4.5 | 6 | 9 | 12 | 18 | 24 | 27 |
| PHY Symbols for Message | 782 | 521 | 391 | 261 | 196 | 130 | 98 | 87 |
| PHY Message Preamble in micro seconds | 16 | 16 | 16 | 16 | 16 | 16 | 16 | 16 |
| PHY Message Signal in micro seconds | 4 | 4 | 4 | 4 | 4 | 4 | 4 | 4 |

TABLE 5-continued

Exemplary System Component Utilization - With Application of Protocol Driven Power Management, Host Data Rate = 18 Mbits/sec

| | | | | | | | | | |
|---|---|---|---|---|---|---|---|---|---|
| (Tphytx) PHY Message Tx time in micro seconds | 3148 | 2104 | 1584 | 1064 | 804 | 540 | 412 | 368 | |
| (TACKRx) PHYRx Ack reception | 40 | 40 | 40 | 40 | 40 | 40 | 40 | 40 | |
| (TPHDelivery) Message Delivery time including Ack Receiving Station | 3188 | 2144 | 1624 | 1104 | 844 | 580 | 452 | 408 | |
| (Tphyrx) PHY Message Rx time in micro seconds | 3148 | 2104 | 1584 | 1064 | 804 | 540 | 412 | 368 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-sec | 1024 | 1024 | 1024 | 1024 | 1024 | 1024 | 1024 | 1024 | |
| MAC Processing time in micro seconds | 1043 | 1043 | 1043 | 1043 | 782 | 521 | 391 | 348 | |
| Message Delivery time including Ack | 3188 | 2144 | 1624 | 1104 | 844 | 580 | 452 | 408 | |
| MAC and PHY Times | 3188 | 2144 | 1624 | 1104 | 844 | 580 | 452 | 408 | |
| Total Message Delivery | 3188 | 2144 | 1624 | 1104 | 1024 | 1024 | 1024 | 1024 | |
| (Sending) MACTx ON Percentage | 33 | 49 | 64 | 94 | 76 | 51 | 38 | 34 | 55 |
| (Sending) PHY Tx ON Percentage | 99 | 98 | 98 | 96 | 79 | 53 | 40 | 36 | 75 |
| (Sending) PHY Rx ON Percentage | 1 | 2 | 2 | 4 | 4 | 4 | 4 | 4 | 3 |
| (Receiving) PHY Rx On Time | 99 | 98 | 98 | 96 | 79 | 53 | 40 | 36 | 75 |
| (Receiving) PHY Tx ON Percentage | 1 | 2 | 2 | 4 | 4 | 4 | 4 | 4 | 3 |
| (Receiving) MAC Rx On Percentage | 33 | 49 | 64 | 94 | 76 | 51 | 38 | 34 | 55 |

TABLE 6

Exemplary System Component Utilization - With Application of Protocol Driven Power Management, Host Data Rate = 24 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| (DR) Host Data Rate Mbits/sec | 24 | 24 | 24 | 24 | 24 | 24 | 24 | 24 | |
| (Thostin) Time to Fill MACTx in Buffer in micro-sec | 768 | 768 | 768 | 768 | 768 | 768 | 768 | 768 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| (MR) MAC Data Rate in Mbits/second | 24 | 24 | 24 | 24 | 24 | 36 | 48 | 54 | |
| (Tmactx) MAC Processing time in micro seconds | 782 | 782 | 782 | 782 | 782 | 521 | 391 | 348 | |
| (PR) PHY Data Rate in Mbits/Second | 6 | 9 | 12 | 18 | 24 | 36 | 48 | 54 | |
| PHY Bytes per symbol | 3 | 4.5 | 6 | 9 | 12 | 18 | 24 | 27 | |
| PHY Symbols for Message | 782 | 521 | 391 | 261 | 196 | 130 | 98 | 87 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| (Tphytx) PHY Message Tx time in micro seconds | 3148 | 2104 | 1584 | 1064 | 804 | 540 | 412 | 368 | |
| (TACKRx) PHYRx Ack reception | 40 | 40 | 40 | 40 | 40 | 40 | 40 | 40 | |
| (TPHDelivery) Message Delivery time including Ack Receiving Station | 3188 | 2144 | 1624 | 1104 | 844 | 580 | 452 | 408 | |
| (Tphyrx) PHY Message Rx time in micro seconds | 3148 | 2104 | 1584 | 1064 | 804 | 540 | 412 | 368 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-sec | 768 | 768 | 768 | 768 | 768 | 768 | 768 | 768 | |
| MAC Processing time in micro seconds | 782 | 782 | 782 | 782 | 782 | 521 | 391 | 348 | |
| Message Delivery time including Ack | 3188 | 2144 | 1624 | 1104 | 844 | 580 | 452 | 408 | |
| MAC and PHY Times | 3188 | 2144 | 1624 | 1104 | 844 | 580 | 452 | 408 | |
| Total Message Delivery | 3188 | 2144 | 1624 | 1104 | 844 | 768 | 768 | 768 | |
| (Sending) MACTx ON Percentage | 25 | 36 | 48 | 71 | 93 | 68 | 51 | 45 | 55 |
| (Sending) PHY Tx ON Percentage | 99 | 98 | 98 | 96 | 95 | 70 | 54 | 48 | 82 |
| (Sending) PHY Rx ON Percentage | 1 | 2 | 2 | 4 | 5 | 5 | 5 | 5 | 4 |
| (Receiving) PHY Rx On Time | 99 | 98 | 98 | 96 | 95 | 70 | 54 | 48 | 82 |
| (Receiving) PHY Tx ON Percentage | 1 | 2 | 2 | 4 | 5 | 5 | 5 | 5 | 4 |
| (Receiving) MAC Rx On Percentage | 25 | 36 | 48 | 71 | 93 | 68 | 51 | 45 | 55 |

TABLE 7

Exemplary System Component Utilization - With Application of Protocol Driven Power Management, Host Data Rate = 36 Mbits/sec Transmitting Station

| | | | | | | | | |
|---|---|---|---|---|---|---|---|---|
| Maximum Message Length in Bytes | 2304 | 2304 | 2304 | 2304 | 2304 | 2304 | 2304 | 2304 |
| (DR) Host Data Rate Mbits/sec | 36 | 36 | 36 | 36 | 36 | 36 | 36 | 36 |

TABLE 7-continued

Exemplary System Component Utilization - With Application of Protocol Driven Power Management, Host Data Rate = 36 Mbits/sec

| | | | | | | | | |
|---|---|---|---|---|---|---|---|---|
| (Thostin) Time to Fill MACTx in Buffer in micro-s | 512 | 512 | 512 | 512 | 512 | 512 | 512 | 512 |
| MAC Encryption Overhead in Bytes | 8 | 8 | 8 | 8 | 8 | 8 | 8 | 8 |
| MAC Header in Bytes (including FCS) | 34 | 34 | 34 | 34 | 34 | 34 | 34 | 34 |
| Message and header Length | 2346 | 2346 | 2346 | 2346 | 2346 | 2346 | 2346 | 2346 |
| (MR) MAC Data Rate in Mbits/second | 36 | 36 | 36 | 36 | 36 | 36 | 48 | 54 |
| (Tmactx) MAC Processing time in micro second | 521 | 521 | 521 | 521 | 521 | 521 | 391 | 348 |
| (PR) PHY Data Rate in Mbits/Second | 6 | 9 | 12 | 18 | 24 | 36 | 48 | 54 |
| PHY Bytes per symbol | 3 | 4.5 | 6 | 9 | 12 | 18 | 24 | 27 |
| PHY Symbols for Message | 782 | 521 | 391 | 261 | 196 | 130 | 98 | 87 |
| PHY Message Preamble in micro seconds | 16 | 16 | 16 | 16 | 16 | 16 | 16 | 16 |
| PHY Message Signal in micro seconds | 4 | 4 | 4 | 4 | 4 | 4 | 4 | 4 |
| (Tphytx) PHY Message Tx time in micro second | 3148 | 2104 | 1584 | 1064 | 804 | 540 | 412 | 368 |
| (TACKRx) PHYRx Ack reception | 40 | 40 | 40 | 40 | 40 | 40 | 40 | 40 |
| (TPHDelivery) Message Delivery time including A Receiving Station | 3188 | 2144 | 1624 | 1104 | 844 | 580 | 452 | 408 |
| (Tphyrx) PHY Message Rx time in micro secon | 3148 | 2104 | 1584 | 1064 | 804 | 540 | 412 | 368 |
| Ack Preparation delay in micro seconds | 16 | 16 | 16 | 16 | 16 | 16 | 16 | 16 |
| Ack Length (16 + 4 + 4) micro seconds | 24 | 24 | 24 | 24 | 24 | 24 | 24 | 24 |
| (TACKTx) PHY Ack transmission | 40 | 40 | 40 | 40 | 40 | 40 | 40 | 40 |
| Time to Fill MACTx in Buffer in micro-sec | 512 | 512 | 512 | 512 | 512 | 512 | 512 | 512 |
| MAC Processing time in micro seconds | 521 | 521 | 521 | 521 | 521 | 521 | 391 | 348 |
| Message Delivery time including Ack | 3188 | 2144 | 1624 | 1104 | 844 | 580 | 452 | 408 |
| MAC and PHY Times | 3188 | 2144 | 1624 | 1104 | 844 | 580 | 452 | 408 |
| Total Message Delivery | 3188 | 2144 | 1624 | 1104 | 844 | 580 | 512 | 512 |
| (Sending) MACTx ON Percentage | 16 | 24 | 32 | 47 | 62 | 90 | 76 | 68 | 52 |
| (Sending) PHY Tx ON Percentage | 99 | 98 | 98 | 96 | 95 | 93 | 80 | 72 | 91 |
| (Sending) PHY Rx ON Percentage | 1 | 2 | 2 | 4 | 5 | 7 | 8 | 8 | 5 |

TABLE 8

Exemplary System Component Utilization - With Application of Protocol Driven Power Management, Host Data Rate = 48 Mbits/sec Transmitting Station

| | | | | | | | | |
|---|---|---|---|---|---|---|---|---|
| Maximum Message Length in Bytes | 2304 | 2304 | 2304 | 2304 | 2304 | 2304 | 2304 | 2304 |
| (DR Host Data Rate Mbits/sec | 48 | 48 | 48 | 48 | 48 | 48 | 48 | 48 |
| (Thostin) Time to Fill MACTx in Buffer in | 384 | 384 | 384 | 384 | 384 | 384 | 384 | 384 |
| MAC Encryption Overhead in Bytes | 8 | 8 | 8 | 8 | 8 | 8 | 8 | 8 |
| MAC Header in Bytes (including FCS) | 34 | 34 | 34 | 34 | 34 | 34 | 34 | 34 |
| Message and header Length | 2346 | 2346 | 2346 | 2346 | 2346 | 2346 | 2346 | 2346 |
| (MR) MAC Data Rate in Mbits/second | 48 | 48 | 48 | 48 | 48 | 48 | 48 | 54 |
| (Tmactx) MAC Processing time in micro | 391 | 391 | 391 | 391 | 391 | 391 | 391 | 348 |
| (PR) PHY Data Rate in Mbits/Second | 6 | 9 | 12 | 18 | 24 | 36 | 48 | 54 |
| PHY Bytes per symbol | 3 | 4.5 | 6 | 9 | 12 | 18 | 24 | 27 |
| PHY Symbols for Message | 782 | 521 | 391 | 261 | 196 | 130 | 98 | 87 |
| PHY Message Preamble in micro secon | 16 | 16 | 16 | 16 | 16 | 16 | 16 | 16 |
| PHY Message Signal in micro seconds | 4 | 4 | 4 | 4 | 4 | 4 | 4 | 4 |
| (Tphytx) PHY Message Tx time in micr | 3148 | 2104 | 1584 | 1064 | 804 | 540 | 412 | 368 |
| (TACKRx) PHYRx Ack reception | 40 | 40 | 40 | 40 | 40 | 40 | 40 | 40 |
| (TPHDelivery) Message Delivery time in Receiving Station | 3188 | 2144 | 1624 | 1104 | 844 | 580 | 452 | 408 |
| (Tphyrx) PHY Message Rx time in micr | 3148 | 2104 | 1584 | 1064 | 804 | 540 | 412 | 368 |
| Ack Preparation delay in micro seconds | 16 | 16 | 16 | 16 | 16 | 16 | 16 | 16 |
| Ack Length (16 + 4 + 4) micro seconds | 24 | 24 | 24 | 24 | 24 | 24 | 24 | 24 |
| (TACKTx) PHY Ack transmission | 40 | 40 | 40 | 40 | 40 | 40 | 40 | 40 |
| Time to Fill MACTx in Buffer in micro-se | 384 | 384 | 384 | 384 | 384 | 384 | 384 | 384 |
| MAC Processing time in micro seconds | 391 | 391 | 391 | 391 | 391 | 391 | 391 | 348 |
| Message Delivery time including Ack | 3188 | 2144 | 1624 | 1104 | 844 | 580 | 452 | 408 |
| MAC and PHY Times | 3188 | 2144 | 1624 | 1104 | 844 | 580 | 452 | 408 |
| Total Message Delivery | 3188 | 2144 | 1624 | 1104 | 844 | 580 | 452 | 408 |
| (Sending) MACTx ON Percentage | 12 | 18 | 24 | 35 | 46 | 67 | 87 | 85 | 47 |
| (Sending) PHY Tx ON Percentage | 99 | 98 | 98 | 96 | 95 | 93 | 91 | 90 | 95 |
| (Sending) PHY Rx ON Percentage | 1 | 2 | 2 | 4 | 5 | 7 | 9 | 10 | 5 |
| (Receiving) PHY Rx On Time | 99 | 98 | 98 | 96 | 95 | 93 | 91 | 90 | 95 |
| (Receiving) PHY Tx ON Percentage | 1 | 2 | 2 | 4 | 5 | 7 | 9 | 10 | 5 |
| (Receiving) MAC Rx On Percentage | 12 | 18 | 24 | 35 | 46 | 67 | 87 | 85 | 47 |

TABLE 9

Exemplary System Component Utilization - With Application of the
Protocol Driven Power Management, Host Data Rate = 54 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| (DR) Host Data Rate Mbits/sec | 54 | 54 | 54 | 54 | 54 | 54 | 54 | 54 | |
| (Thostin) Time to Fill MACTx in Buffer in micro-sec | 341 | 341 | 341 | 341 | 341 | 341 | 341 | 341 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| (MR) MAC Data Rate in Mbits/second | 54 | 54 | 54 | 54 | 54 | 54 | 54 | 54 | |
| (Tmactx) MAC Processing time in micro seconds | 348 | 348 | 348 | 348 | 348 | 348 | 348 | 348 | |
| (PR) PHY Data Rate in Mbits/Second | 6 | 9 | 12 | 18 | 24 | 36 | 48 | 54 | |
| PHY Bytes per symbol | 3 | 4.5 | 6 | 9 | 12 | 18 | 24 | 27 | |
| PHY Symbols for Message | 782 | 521 | 391 | 261 | 196 | 130 | 98 | 87 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| (Tphytx) PHY Message Tx time in micro seconds | 3148 | 2104 | 1584 | 1064 | 804 | 540 | 412 | 368 | |
| (TACKRx) PHYRx Ack reception | 40 | 40 | 40 | 40 | 40 | 40 | 40 | 40 | |
| (TPHDelivery) Message Delivery time including Ack | 3188 | 2144 | 1624 | 1104 | 844 | 580 | 452 | 408 | |

Receiving Station

| | | | | | | | | | |
|---|---|---|---|---|---|---|---|---|---|
| (Tphyrx) PHY Message Rx time in micro seconds | 3148 | 2104 | 1584 | 1064 | 804 | 540 | 412 | 368 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-sec | 341 | 341 | 341 | 341 | 341 | 341 | 341 | 341 | |
| MAC Processing time in micro seconds | 348 | 348 | 348 | 348 | 348 | 348 | 348 | 348 | |
| Message Delivery time including Ack | 3188 | 2144 | 1624 | 1104 | 844 | 580 | 452 | 408 | |
| MAC and PHY Times | 3188 | 2144 | 1624 | 1104 | 844 | 580 | 452 | 408 | |
| Total Message Delivery | 3188 | 2144 | 1624 | 1104 | 844 | 580 | 452 | 408 | |
| (Sending) MACTx ON Percentage | 11 | 16 | 21 | 32 | 41 | 60 | 77 | 85 | 43 |
| (Sending) PHY Tx ON Percentage | 99 | 98 | 98 | 96 | 95 | 93 | 91 | 90 | 95 |
| (Sending) PHY Rx ON Percentage | 1 | 2 | 2 | 4 | 5 | 7 | 9 | 10 | 5 |
| (Receiving) PHY Rx On Time | 99 | 98 | 98 | 96 | 95 | 93 | 91 | 90 | 95 |
| (Receiving) PHY Tx ON Percentage | 1 | 2 | 2 | 4 | 5 | 7 | 9 | 10 | 5 |
| (Receiving) MAC Rx On Percentage | 11 | 16 | 21 | 32 | 41 | 60 | 77 | 85 | 43 |

TABLE 10

Exemplary System Component Utilization - Without Application of Protocol
Driven Power Management, Host Data Rate = 6 Mbits/sec. Overall performance average
over all Host data rates are shown in the last column.

System Component Utilization Analysis Without Protocol Driven Power Management
Last Update on 11/8/2001
Transmitting Station

| | | | | | | | | |
|---|---|---|---|---|---|---|---|---|
| Maximum Message Length in Bytes | 2304 | 2304 | 2304 | 2304 | 2304 | 2304 | 2304 | 2304 |
| ($D_R$) Host Data Rate Mbits/sec | 6 | 6 | 6 | 6 | 6 | 6 | 6 | 6 |
| ($T_{hostin}$) Time to Fill MACTx in Buffer in micro | 3072 | 3072 | 3072 | 3072 | 3072 | 3072 | 3072 | 3072 |
| MAC Encryption Overhead in Bytes | 8 | 8 | 8 | 8 | 8 | 8 | 8 | 8 |
| MAC Header in Bytes (including FCS) | 34 | 34 | 34 | 34 | 34 | 34 | 34 | 34 |
| Message and header Length | 2346 | 2346 | 2346 | 2346 | 2346 | 2346 | 2346 | 2346 |
| ($M_R$) MAC Data Rate in Mbits/second | 6 | 6 | 6 | 6 | 6 | 6 | 6 | 6 |
| ($T_{mactx}$) MAC Processing time in micro secon | 3128 | 3128 | 3128 | 3128 | 3128 | 3128 | 3128 | 3128 |
| ($P_R$) PHY Data Rate in Mbits/Second | 6 | 6 | 6 | 6 | 6 | 6 | 6 | 6 |
| PHY Bytes per symbol | 3 | 3 | 3 | 3 | 3 | 3 | 3 | 3 |
| PHY Symbols for Message | 782 | 782 | 782 | 782 | 782 | 782 | 782 | 782 |
| PHY Message Preamble in micro seconds | 16 | 16 | 16 | 16 | 16 | 16 | 16 | 16 |
| PHY Message Signal in micro seconds | 4 | 4 | 4 | 4 | 4 | 4 | 4 | 4 |
| ($T_{phytx}$) PHY Message Tx time in micro seco | 3148 | 3148 | 3148 | 3148 | 3148 | 3148 | 3148 | 3148 |
| ($T_{ACKRx}$) PHYRx Ack reception | 40 | 40 | 40 | 40 | 40 | 40 | 40 | 40 |
| ($T_{PHDelivery}$) Message Delivery time including A | 3188 | 3188 | 3188 | 3188 | 3188 | 3188 | 3188 | 3188 |

Receiving Station

| | | | | | | | | |
|---|---|---|---|---|---|---|---|---|
| ($T_{phyrx}$) PHY Message Rx time in micro seco | 3148 | 3148 | 3148 | 3148 | 3148 | 3148 | 3148 | 3148 |
| Ack Preparation delay in micro seconds | 16 | 16 | 16 | 16 | 16 | 16 | 16 | 16 |
| Ack Length (16 + 4 + 4) micro seconds | 24 | 24 | 24 | 24 | 24 | 24 | 24 | 24 |
| ($T_{ACKTx}$) PHY Ack transmission | 40 | 40 | 40 | 40 | 40 | 40 | 40 | 40 |
| Time to Fill MACTx in Buffer in micro-sec | 3072 | 3072 | 3072 | 3072 | 3072 | 3072 | 3072 | 3072 |
| MAC Processing time in micro seconds | 3128 | 3128 | 3128 | 3128 | 3128 | 3128 | 3128 | 3128 |
| Message Delivery time including Ack | 3188 | 3188 | 3188 | 3188 | 3188 | 3188 | 3188 | 3188 |
| MAC and PHY Times | 3188 | 3188 | 3188 | 3188 | 3188 | 3188 | 3188 | 3188 |
| Total Message Delivery | 3188 | 3188 | 3188 | 3188 | 3188 | 3188 | 3188 | 3188 |

TABLE 10-continued

Exemplary System Component Utilization - Without Application of Protocol Driven Power Management, Host Data Rate = 6 Mbits/sec. Overall performance average over all Host data rates are shown in the last column.

| | | | | | | | | | | |
|---|---|---|---|---|---|---|---|---|---|---|
| (Sending) MACTx ON Percentage | 96 | 98 | 98 | 96 | 98 | 98 | 98 | 98 | 98 | 95.125 |
| (Sending) PHY Tx ON Percentage | 99 | 99 | 99 | 99 | 99 | 99 | 99 | 99 | 99 | 96.75 |
| (Sending) PHY Rx ON Percentage | 1 | 1 | 1 | 1 | 1 | 1 | 1 | 1 | 1 | 3.25 |
| (Receiving) PHY Rx On Time | 99 | 99 | 99 | 99 | 99 | 99 | 99 | 99 | 99 | 96.75 |
| (Receiving) PHY Tx ON Percentage | 1 | 1 | 1 | 1 | 1 | 1 | 1 | 1 | 1 | 3.25 |
| (Receiving) MAC Rx On Percentage | 98 | 98 | 98 | 98 | 98 | 98 | 98 | 98 | 98 | 95.125 |
| | | | | | | | | | Avg Total | Avg |

TABLE 11

Exemplary System Component Utilization - Without Application of Protocol Driven Power Management, Host Data Rate = 9 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| ($D_R$) Host Data Rate Mbits/sec | 9 | 9 | 9 | 9 | 9 | 9 | 9 | 9 | |
| ($T_{hostin}$) Time to Fill MACTx in Buffer in micro-sec | 2048 | 2048 | 2048 | 2048 | 2048 | 2048 | 2048 | 2048 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| ($M_R$) MAC Data Rate in Mbits/second | 6 | 9 | 9 | 9 | 9 | 9 | 9 | 9 | |
| ($T_{mactx}$) MAC Processing time in micro seconds | 3128 | 2085 | 2085 | 2085 | 2085 | 2085 | 2085 | 2085 | |
| ($P_R$) PHY Data Rate in Mbits/Second | 6 | 9 | 9 | 9 | 9 | 9 | 9 | 9 | |
| PHY Bytes per symbol | 3 | 4.5 | 4.5 | 4.5 | 4.5 | 4.5 | 4.5 | 4.5 | |
| PHY Symbols for Message | 782 | 521 | 521 | 521 | 521 | 521 | 521 | 521 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| ($T_{phytx}$) PHY Message Tx time in micro seconds | 3148 | 2104 | 2104 | 2104 | 2104 | 2104 | 2104 | 2104 | |
| ($T_{ACKRx}$) PHYRx Ack reception | 40 | 40 | 40 | 40 | 40 | 40 | 40 | 40 | |
| ($T_{PHDelivery}$) Message Delivery time including Ack | 3188 | 2144 | 2144 | 2144 | 2144 | 2144 | 2144 | 2144 | |

Receiving Station

| | | | | | | | | | |
|---|---|---|---|---|---|---|---|---|---|
| ($T_{phyrx}$) PHY Message Rx time in micro seconds | 3148 | 2104 | 2104 | 2104 | 2104 | 2104 | 2104 | 2104 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| ($T_{ACKTx}$) PHY Ack transmission | 40 | 40 | 40 | 40 | 40 | 40 | 40 | 40 | |
| Time to Fill MACTx in Buffer in micro-sec | 2048 | 2048 | 2048 | 2048 | 2048 | 2048 | 2048 | 2048 | |
| MAC Processing time in micro seconds | 3128 | 2085 | 2085 | 2085 | 2085 | 2085 | 2085 | 2085 | |
| Message Delivery time including Ack | 3188 | 2144 | 2144 | 2144 | 2144 | 2144 | 2144 | 2144 | |
| MAC and PHY Times | 3188 | 2144 | 2144 | 2144 | 2144 | 2144 | 2144 | 2144 | |
| Total Message Delivery | 3188 | 2144 | 2144 | 2144 | 2144 | 2144 | 2144 | 2144 | |
| (Sending) MACTx ON Percentage | 98 | 97 | 97 | 97 | 97 | 97 | 97 | 97 | 97 |
| (Sending) PHY Tx ON Percentage | 99 | 98 | 98 | 98 | 98 | 98 | 98 | 98 | 98 |
| (Sending) PHY Rx ON Percentage | 1 | 2 | 2 | 2 | 2 | 2 | 2 | 2 | 2 |
| (Receiving) PHY Rx On Time | 99 | 98 | 98 | 98 | 98 | 98 | 98 | 98 | 98 |
| (Receiving) PHY Tx ON Percentage | 1 | 2 | 2 | 2 | 2 | 2 | 2 | 2 | 2 |
| (Receiving) MAC Rx On Percentage | 96 | 97 | 97 | 97 | 97 | 97 | 97 | 97 | 97 |

TABLE 12

Exemplary System Component Utilization - Without Application of Protocol Driven Power Management, Host Data Rate = 12 Mbits/sec Transmitting Station

| | | | | | | | | |
|---|---|---|---|---|---|---|---|---|
| Maximum Message Length in Bytes | 2304 | 2304 | 2304 | 2304 | 2304 | 2304 | 2304 | 2304 |
| ($D_R$) Host Data Rate Mbits/sec | 12 | 12 | 12 | 12 | 12 | 12 | 12 | 12 |
| ($T_{hostin}$) Time to Fill MACTx in Buffer in micro-sec | 1536 | 1536 | 1536 | 1536 | 1536 | 1536 | 1536 | 1536 |
| MAC Encryption Overhead in Bytes | 8 | 8 | 8 | 8 | 8 | 8 | 8 | 8 |
| MAC Header in Bytes (including FCS) | 34 | 34 | 34 | 34 | 34 | 34 | 34 | 34 |
| Message and header Length | 2346 | 2346 | 2346 | 2346 | 2346 | 2346 | 2346 | 2346 |
| ($M_R$) MAC Data Rate in Mbits/second | 6 | 9 | 12 | 12 | 12 | 12 | 12 | 12 |
| ($T_{mactx}$) MAC Processing time in micro seconds | 3126 | 2085 | 1564 | 1564 | 1564 | 1564 | 1564 | 1564 |
| ($P_R$) PHY Data Rate in Mbits/Second | 6 | 9 | 12 | 12 | 12 | 12 | 12 | 12 |
| PHY Bytes per symbol | 3 | 4.5 | 6 | 6 | 6 | 6 | 6 | 6 |
| PHY Symbols for Message | 782 | 521 | 391 | 391 | 391 | 391 | 391 | 391 |
| PHY Message Preamble in micro seconds | 16 | 16 | 16 | 16 | 16 | 16 | 16 | 16 |
| PHY Message Signal in micro seconds | 4 | 4 | 4 | 4 | 4 | 4 | 4 | 4 |
| ($T_{phytx}$) PHY Message Tx time in micro seconds | 3148 | 2104 | 1584 | 1584 | 1584 | 1584 | 1584 | 1584 |

TABLE 12-continued

Exemplary System Component Utilization - Without Application of Protocol Driven Power Management, Host Data Rate = 12 Mbits/sec

| | | | | | | | | | |
|---|---|---|---|---|---|---|---|---|---|
| ($T_{ACKRx}$) PHYRx Ack reception | 40 | 40 | 40 | 40 | 40 | 40 | 40 | 40 | |
| ($T_{PHDelivery}$) Message Delivery time including Ack | 3188 | 2144 | 1624 | 1624 | 1624 | 1624 | 1624 | 1624 | |
| Receiving Station | | | | | | | | | |
| ($T_{phyrx}$) PHY Message Rx time in micro seconds | 3148 | 2104 | 1584 | 1584 | 1584 | 1584 | 1584 | 1584 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| ($T_{ACKTx}$) PHY Ack transmission | 40 | 40 | 40 | 40 | 40 | 40 | 40 | 40 | |
| Time to Fill MACTx in Buffer in micro-sec | 1536 | 1536 | 1536 | 1536 | 1536 | 1536 | 1536 | 1536 | |
| MAC Processing time in micro seconds | 3128 | 2085 | 1584 | 1584 | 1584 | 1584 | 1584 | 1584 | |
| Message Delivery time including Ack | 3188 | 2144 | 1624 | 1624 | 1624 | 1624 | 1624 | 1624 | |
| MAC and PHY Times | 3188 | 2144 | 1624 | 1624 | 1624 | 1624 | 1624 | 1624 | |
| Total Message Delivery | 3188 | 2144 | 1624 | 1624 | 1624 | 1624 | 1624 | 1624 | |
| (Sending) MACTx ON Percentage | 96 | 97 | 96 | 96 | 96 | 96 | 96 | 96 | 96 |
| (Sending) PHY Tx ON Percentage | 99 | 98 | 98 | 98 | 98 | 98 | 98 | 98 | 98 |
| (Sending) PHY Rx ON Percentage | 1 | 2 | 2 | 2 | 2 | 2 | 2 | 2 | 2 |
| (Receiving) PHY Rx On Time | 99 | 98 | 98 | 98 | 98 | 98 | 98 | 98 | 98 |
| (Receiving) PHY Tx ON Percentage | 1 | 2 | 2 | 2 | 2 | 2 | 2 | 2 | 2 |
| (Receiving) MAC Rx On Percentage | 96 | 97 | 96 | 96 | 96 | 96 | 96 | 96 | |

TABLE 13

Exemplary System Component Utilization - Without Application of Protocol Driven Power Management, Host Data Rate = 18 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| (DR) Host Data Rate Mbits/sec | 18 | 18 | 18 | 18 | 18 | 18 | 18 | 18 | |
| (Thostin) Time to Fill MACTx in Buffer in micro-sec | 1024 | 1024 | 1024 | 1024 | 1024 | 1024 | 1024 | 1024 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| (MR) MAC Data Rate in Mbits/second | 6 | 9 | 12 | 18 | 18 | 18 | 18 | 18 | |
| (Tmactx) MAC Processing time in micro seconds | 3128 | 2085 | 1564 | 1043 | 1043 | 1043 | 1043 | 1043 | |
| (PR) PHY Data Rate in Mbits/Second | 6 | 9 | 12 | 18 | 18 | 18 | 18 | 18 | |
| PHY Bytes per symbol | 3 | 4.5 | 6 | 9 | 9 | 9 | 9 | 9 | |
| PHY Symbols for Message | 782 | 521 | 391 | 261 | 261 | 261 | 261 | 261 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| (Tphytx) PHY Message Tx time in micro seconds | 3148 | 2104 | 1584 | 1064 | 1064 | 1064 | 1064 | 1064 | |
| (TACKRx) PHYRx Ack reception | 40 | 40 | 40 | 40 | 40 | 40 | 40 | 40 | |
| (TPHDelivery) Message Delivery time including Ack | 3188 | 2144 | 1624 | 1104 | 1104 | 1104 | 1104 | 1104 | |
| Receiving Station | | | | | | | | | |
| (Tphyrx) PHY Message Rx time in micro seconds | 3148 | 2104 | 1584 | 1064 | 1064 | 1064 | 1064 | 1064 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-sec | 1024 | 1024 | 1024 | 1024 | 1024 | 1024 | 1024 | 1024 | |
| MAC Processing time in micro seconds | 3128 | 2085 | 1564 | 1043 | 1043 | 1043 | 1043 | 1043 | |
| Message Delivery time including Ack | 3188 | 2144 | 1624 | 1104 | 1104 | 1104 | 1104 | 1104 | |
| MAC and PHY Times | 3188 | 2144 | 1624 | 1104 | 1104 | 1104 | 1104 | 1104 | |
| Total Message Delivery | 3188 | 2144 | 1624 | 1104 | 1104 | 1104 | 1104 | 1104 | |
| (Sending) MACTx ON Percentage | 98 | 97 | 96 | 94 | 94 | 94 | 94 | 94 | 95 |
| (Sending) PHY Tx ON Percentage | 99 | 98 | 98 | 96 | 96 | 96 | 96 | 96 | 97 |
| (Sending) PHY Rx ON Percentage | 1 | 2 | 2 | 4 | 4 | 4 | 4 | 4 | 3 |
| (Receiving) PHY Rx On Time | 99 | 98 | 98 | 96 | 96 | 96 | 96 | 96 | 97 |
| (Receiving) PHY Tx ON Percentage | 1 | 2 | 2 | 4 | 4 | 4 | 4 | 4 | 3 |
| (Receiving) MAC Rx On Percentage | 98 | 97 | 96 | 94 | 94 | 94 | 94 | 94 | 95 |

TABLE 14

Exemplary System Component Utilization - Without Application of Protocol Driven Power Management, Host Data Rate = 24 Mbits/sec Transmitting Station

| | | | | | | | | |
|---|---|---|---|---|---|---|---|---|
| Maximum Message Length in Bytes | 2304 | 2304 | 2304 | 2304 | 2304 | 2304 | 2304 | 2304 |
| (DR) Host Data Rate Mbits/sec | 24 | 24 | 24 | 24 | 24 | 24 | 24 | 24 |
| (Thostin) Time to Fill MACTx in Buffer in micro-se | 768 | 768 | 768 | 768 | 768 | 768 | 768 | 768 |

TABLE 14-continued

Exemplary System Component Utilization - Without Application of Protocol Driven Power Management, Host Data Rate = 24 Mbits/sec

| | | | | | | | | | |
|---|---|---|---|---|---|---|---|---|---|
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| (MR) MAC Data Rate in Mbits/second | 6 | 9 | 12 | 18 | 24 | 24 | 24 | 24 | |
| (Tmactx) MAC Processing time in micro seconds | 3128 | 2085 | 1564 | 1043 | 782 | 782 | 782 | 782 | |
| (PR) PHY Data Rate in Mbits/Second | 6 | 9 | 12 | 18 | 24 | 24 | 24 | 24 | |
| PHY Bytes per symbol | 3 | 4.5 | 6 | 9 | 12 | 12 | 12 | 12 | |
| PHY Symbols for Message | 782 | 521 | 391 | 261 | 196 | 196 | 196 | 196 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| (Tphytx) PHY Message Tx time in micro seconds | 3148 | 2104 | 1585 | 1064 | 804 | 804 | 804 | 804 | |
| (TACKRx) PHYRx Ack reception | 40 | 40 | 40 | 40 | 40 | 40 | 40 | 40 | |
| (TPHDelivery) Message Delivery time including Ac Receiving Station | 3188 | 2144 | 1624 | 1104 | 844 | 844 | 844 | 844 | |
| (Tphyrx) PHY Message Rx time in micro seconds | 3148 | 2104 | 1584 | 1064 | 804 | 804 | 804 | 804 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-sec | 768 | 768 | 768 | 768 | 768 | 768 | 768 | 768 | |
| MAC Processing time in micro seconds | 3128 | 2085 | 1564 | 1043 | 782 | 782 | 782 | 782 | |
| Message Delivery time including Ack | 3188 | 2144 | 1624 | 1104 | 844 | 844 | 844 | 844 | |
| MAC and PHY Times | 3188 | 2144 | 1624 | 1104 | 844 | 844 | 844 | 844 | |
| Total Message Delivery | 3188 | 2144 | 1624 | 1104 | 844 | 844 | 844 | 844 | |
| (Sending) MACTx ON Percentage | 98 | 97 | 96 | 94 | 93 | 93 | 93 | 93 | 95 |
| (Sending) PHY Tx ON Percentage | 99 | 98 | 98 | 96 | 95 | 95 | 95 | 95 | 96 |
| (Sending) PHY Rx ON Percentage | 1 | 2 | 2 | 4 | 5 | 5 | 5 | 5 | 4 |
| (Receiving) PHY Rx On Time | 99 | 98 | 98 | 96 | 95 | 95 | 95 | 95 | 96 |
| (Receiving) PHY Tx ON Percentage | 1 | 2 | 2 | 4 | 5 | 5 | 5 | 5 | 4 |
| (Receiving) MAC Rx On Percentage | 98 | 97 | 96 | 94 | 93 | 93 | 93 | 93 | 95 |

TABLE 15

Exemplary System Component Utilization - Without the Protocol Driven Power Management, Host Data Rate = 36 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| (DR) Host Data Rate Mbits/sec | 36 | 36 | 36 | 36 | 36 | 36 | 36 | 36 | |
| (Thostin) Time to Fill MACTx in Buffer in micro-s | 512 | 512 | 512 | 512 | 512 | 512 | 512 | 512 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| (MR) MAC Data Rate in Mbits/second | 6 | 9 | 12 | 18 | 24 | 36 | 36 | 36 | |
| (Tmactx) MAC Processing time in micro second | 3128 | 2085 | 1564 | 1043 | 782 | 521 | 521 | 521 | |
| (PR) PHY Data Rate in Mbits/Second | 6 | 9 | 12 | 18 | 24 | 36 | 36 | 36 | |
| PHY Bytes per symbol | 3 | 4.5 | 6 | 9 | 12 | 18 | 18 | 18 | |
| PHY Symbols for Message | 782 | 521 | 391 | 261 | 196 | 130 | 130 | 130 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| (Tphytx) PHY Message Tx time in micro second | 3148 | 2104 | 1584 | 1064 | 804 | 540 | 540 | 540 | |
| (TACKRx) PHYRx Ack reception | 40 | 40 | 40 | 40 | 40 | 40 | 40 | 40 | |
| (TPHDelivery) Message Delivery time including A Receiving Station | 3188 | 2144 | 1624 | 1104 | 844 | 580 | 580 | 580 | |
| (Tphyrx) PHY Message Rx time in micro seconds | 3148 | 2104 | 1584 | 1064 | 804 | 540 | 540 | 540 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-sec | 512 | 512 | 512 | 512 | 512 | 512 | 512 | 512 | |
| MAC Processing time in micro seconds | 3128 | 2085 | 1564 | 1043 | 782 | 521 | 521 | 521 | |
| Message Delivery time including Ack | 3188 | 2144 | 1624 | 1104 | 844 | 580 | 580 | 580 | |
| MAC and PHY Times | 3188 | 2144 | 1624 | 1104 | 844 | 580 | 580 | 580 | |
| Total Message Delivery | 3188 | 2144 | 1624 | 1104 | 844 | 580 | 580 | 580 | |
| (Sending) MACTx ON Percentage | 98 | 97 | 96 | 94 | 93 | 90 | 90 | 90 | 94 |
| (Sending) PHY Tx ON Percentage | 99 | 98 | 98 | 96 | 95 | 93 | 93 | 93 | 96 |
| (Sending) PHY Rx ON Percentage | 1 | 2 | 2 | 4 | 5 | 7 | 7 | 7 | 4 |
| (Receiving) PHY Rx On Time | 99 | 98 | 98 | 96 | 95 | 93 | 93 | 93 | 96 |
| (Receiving) PHY Tx ON Percentage | 1 | 2 | 2 | 4 | 5 | 7 | 7 | 7 | 4 |
| (Receiving) MAC Rx On Percentage | 98 | 97 | 96 | 94 | 93 | 90 | 90 | 90 | 94 |

TABLE 16

Exemplary System Component Utilization - Without Application of Protocol Driven Power Management, Host Data Rate = 48 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| (DR) Host Data Rate Mbits/sec | 48 | 48 | 48 | 48 | 48 | 48 | 48 | 48 | |
| (Thostin) Time to Fill MACTx in Buffer | 384 | 384 | 384 | 384 | 384 | 384 | 384 | 384 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| (MR) MAC Data Rate in Mbits/second | 6 | 9 | 12 | 18 | 24 | 36 | 48 | 48 | |
| (Tmactx) MAC Processing time in micro | 3128 | 2085 | 1564 | 1043 | 782 | 521 | 391 | 391 | |
| (PR) PHY Data Rate in Mbits/Second | 6 | 9 | 12 | 18 | 24 | 36 | 48 | 48 | |
| PHY Bytes per symbol | 3 | 4.5 | 6 | 9 | 12 | 18 | 24 | 24 | |
| PHY Symbols for Message | 782 | 521 | 391 | 261 | 196 | 130 | 98 | 98 | |
| PHY Message Preamble in micro secon | 16 | 16 | 16 | 16 | 16 | 16 | 16 | 16 | |
| PHY Message Signal in micro seconds | 4 | 4 | 4 | 4 | 4 | 4 | 4 | 4 | |
| (Tphytx) PHY Message Tx time in micr | 3148 | 2104 | 1584 | 1064 | 804 | 540 | 412 | 412 | |
| (TACKRx) PHYRx Ack reception | 40 | 40 | 40 | 40 | 40 | 40 | 40 | 40 | |
| (TPHDelivery) Message Delivery time in | 3188 | 2144 | 1624 | 1104 | 844 | 580 | 452 | 452 | |

Receiving Station

| | | | | | | | | | |
|---|---|---|---|---|---|---|---|---|---|
| (Tphyrx) PHY Message Rx time in micr | 3148 | 2104 | 1584 | 1064 | 804 | 540 | 412 | 412 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-se | 384 | 384 | 384 | 384 | 384 | 384 | 384 | 384 | |
| MAC Processing time in micro seconds | 3128 | 2085 | 1564 | 1043 | 782 | 521 | 391 | 391 | |
| Message Delivery time including Ack | 3188 | 2144 | 1624 | 1104 | 844 | 580 | 452 | 452 | |
| MAC and PHY Times | 3188 | 2144 | 1624 | 1104 | 844 | 580 | 452 | 452 | |
| Total Message Delivery | 3188 | 2144 | 1624 | 1104 | 844 | 580 | 452 | 452 | |
| (Sending) MACTx ON Percentage | 98 | 97 | 96 | 94 | 93 | 90 | 87 | 87 | 93 |
| (Sending) PHY Tx ON Percentage | 99 | 98 | 98 | 96 | 95 | 93 | 91 | 91 | 95 |
| (Sending) PHY Rx ON Percentage | 1 | 2 | 2 | 4 | 5 | 7 | 9 | 9 | 5 |
| (Receiving) PHY Rx On Time | 99 | 98 | 98 | 96 | 95 | 93 | 91 | 91 | 95 |
| (Receiving) PHY Tx ON Percentage | 1 | 2 | 2 | 4 | 5 | 7 | 9 | 9 | 5 |
| (Receiving) MAC Rx On Percentage | 98 | 97 | 96 | 94 | 93 | 90 | 87 | 87 | 93 |

TABLE 17

Exemplary System Component Utilization - Without Application of Protocol Driven Power Management, Host Data Rate = 54 Mbits/sec Transmitting Station

| | | | | | | | | | |
|---|---|---|---|---|---|---|---|---|---|
| Maximum Message Length in Bytes | 2304 | 2304 | 2304 | 2304 | 2304 | 2304 | 2304 | 2304 | |
| (DR) Host Data Rate Mbits/sec | 54 | 54 | 54 | 54 | 54 | 54 | 54 | 54 | |
| (Thostin) Time to Fill MACTx in Buffer in micro-sec | 341 | 341 | 341 | 341 | 341 | 341 | 341 | 341 | |
| MAC Encryption Overhead in Bytes | 8 | 8 | 8 | 8 | 8 | 8 | 8 | 8 | |
| MAC Header in Bytes (including FCS) | 34 | 34 | 34 | 34 | 34 | 34 | 34 | 34 | |
| Message and header Length | 2346 | 2346 | 2346 | 2346 | 2346 | 2346 | 2346 | 2346 | |
| (MR) MAC Data Rate in Mbits/second | 6 | 9 | 12 | 18 | 24 | 36 | 48 | 54 | |
| (Tmactx) MAC Processing time in micro seconds | 3128 | 2085 | 1564 | 1043 | 782 | 521 | 391 | 348 | |
| (PR) PHY Data Rate in Mbits/Second | 6 | 9 | 12 | 18 | 24 | 36 | 48 | 54 | |
| PHY Bytes per symbol | 3 | 4.5 | 6 | 9 | 12 | 18 | 24 | 27 | |
| PHY Symbols for Message | 782 | 521 | 391 | 261 | 196 | 130 | 98 | 87 | |
| PHY Message Preamble in micro seconds | 16 | 16 | 16 | 16 | 16 | 16 | 16 | 16 | |
| PHY Message Signal in micro seconds | 4 | 4 | 4 | 4 | 4 | 4 | 4 | 4 | |
| (Tphytx) PHY Message Tx time in micro seconds | 3148 | 2104 | 1584 | 1064 | 804 | 540 | 412 | 368 | |
| (TACKRx) PHYRx Ack reception | 40 | 40 | 40 | 40 | 40 | 40 | 40 | 40 | |
| (TPHDelivery) Message Delivery time including Ack | 3188 | 2144 | 1624 | 1104 | 844 | 580 | 452 | 408 | |

Receiving Station

| | | | | | | | | | |
|---|---|---|---|---|---|---|---|---|---|
| (Tphyrx) PHY Message Rx time in micro seconds | 3148 | 2104 | 1584 | 1064 | 804 | 540 | 412 | 368 | |
| Ack Preparation delay in micro seconds | 16 | 16 | 16 | 16 | 16 | 16 | 16 | 16 | |
| Ack Length (16 + 4 + 4) micro seconds | 24 | 24 | 24 | 24 | 24 | 24 | 24 | 24 | |
| (TACKTx) PHY Ack transmission | 40 | 40 | 40 | 40 | 40 | 40 | 40 | 40 | |
| Time to Fill MACTx in Buffer in micro-sec | 341 | 341 | 341 | 341 | 341 | 341 | 341 | 341 | |
| MAC Processing time in micro seconds | 3128 | 2085 | 1564 | 1043 | 782 | 521 | 391 | 348 | |
| Message Delivery time including Ack | 3188 | 2144 | 1624 | 1104 | 844 | 580 | 452 | 408 | |
| MAC and PHY Times | 3188 | 2144 | 1624 | 1104 | 844 | 580 | 452 | 408 | |
| Total Message Delivery | 3188 | 2144 | 1624 | 1104 | 844 | 580 | 452 | 408 | |
| (Sending) MACTx ON Percentage | 98 | 97 | 96 | 94 | 93 | 90 | 87 | 85 | 93 |
| (Sending) PHY Tx ON Percentage | 99 | 98 | 98 | 96 | 95 | 93 | 91 | 90 | 95 |
| (Sending) PHY Rx ON Percentage | 1 | 2 | 2 | 4 | 5 | 7 | 9 | 10 | 5 |

TABLE 17-continued

Exemplary System Component Utilization - Without Application of Protocol
Driven Power Management, Host Data Rate = 54 Mbits/sec

| | | | | | | | | | |
|---|---|---|---|---|---|---|---|---|---|
| (Receiving) PHY Rx On Time | 99 | 98 | 98 | 96 | 95 | 93 | 91 | 90 | 95 |
| (Receiving) PHY Tx ON Percentage | 1 | 2 | 2 | 4 | 5 | 7 | 9 | 10 | 5 |
| (Receiving) MAC Rx On Percentage | 98 | 97 | 96 | 94 | 93 | 90 | 87 | 85 | 93 |

It should be noted that functional components, as shown in the figures and described above in the text accompanying the figures, could be implemented using software code segments. If the aforementioned functional components are implemented using software code segments, these code segments can be stored on a machine-readable medium, such as floppy disk, hard drive, CD-ROM, DVD, tape, memory, or any storage device that is accessible by a computing machine.

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   determining one or more data transmission rates supported by a transmitting node operating according to a first communication protocol, wherein in the transmitting node include a host, a medium access controller (MAC), a physical layer processor (PLP) and two or more buffers as intermediate storage between components in the transmitting node, the one or more buffers including a first buffer coupled to receive data generated by the host and to provide the data generated by the host to the MAC, and a second buffer coupled to receive data generated by the MAC and to provide data generated by the MAC to the PLP;
   determining one or more data transmission rates supported by one or more data transmission channels operating according to the first communication protocol, the one or more data transmission channels being used to communicate data between the transmitting node and a receiving node; and
   setting power consumption levels of one or more components in the transmitting node based on the data transmission rates supported by the transmitting node and the data transmission rates supported by the one or more channels, wherein setting power consumption levels includes:
   determining whether a particular component has finished performing its corresponding function: and
   reducing power consumption level of the particular component if the particular component has finished performing its corresponding function;
   and if the data transmission rate of the host is greater than that of the one or more channels, reducing power consumption of the host after the host has finished writing data to the first buffer during a time interval in which the other components of the transmitting node processing the data stored in the first buffer.

2. The method of claim 1 wherein one or more host circuitry that is in idle state is reduced to a low power consumption (LPC) mode while the other components are processing the data stored in the first buffer.

3. The method of claim 2 wherein the MAC is reduced to a lower power consumption level after the MAC has finished writing data to the second buffer and while the PLP continues to process data.

4. The method of claim 1 further including:
   if the data transmission rate of the host is less than that of the one or more channels, reducing power consumption of the other components after the other components have finished processing data generated by the host.

5. The method of claim 4 wherein the MAC and the PLP are switched to a lower power consumption (LPC) mode after the MAC and PLP have finished their corresponding functions and while the host buffer is being filled by the host.

6. A system comprising:
   a transmitting node including one or more components to process data for transmission to a receiving node wherein the components in the transmitting node include a host, a medium access controller (MAC), a physical layer processor (PLP) and two or more buffers being used as intermediate storage between components in the transmitting node, the buffers including a first buffer coupled to receive data generated by the host and to provide the data generated by the host to the MAC, and a second buffer coupled to received data generated by the MAC and to provide data generated by the MAC to the PLP; and
   one or more channels coupled to the transmitting node and the receiving node, the one or more channels being used to transmit data from the transmitting node to the receiving node,
   wherein power consumption levels of one or more components in the transmitting node are determined based on data transmission rates supported by the transmitting node and data transmission rates supported by the one or more channels, the power consumption level of a particular component in the transmitting node being reduced if the particular component has finished performing its corresponding function, and if the data transmission rate of the host is greater than that of the one or more channels, power consumption of the host is reduced after the host has finished writing data to the first buffer during a time interval in which the other components of the transmitting node processing the data stored in the first buffer.

7. The system of claim 6 wherein one or more host circuitry that is in idle state is reduced to a low power consumption (LPC) mode while the other components are processing the data stored in the first buffer.

8. The system of claim 7 wherein the MAC is reduced to a lower power consumption level after the MAC has finished writing data to the second buffer and while the PLP continues to process data.

9. The system of claim 6 wherein, if the data transmission rate of the host is less than that of the one or more channels, power consumption of the other components is reduced after the other components have finished processing data generated by the host.

10. The system of claim 9 wherein the MAC and the PLP are switched to a lower power consumption (LPC) mode after the MAC and PLP have finished their corresponding functions and while the host buffer is being filled by the host.

11. A tangible machine-readable medium comprising instructions which, when executed by a machine, cause the machine to perform operations including:
    determining one or more data transmission rates supported by a transmitting node operating according to a first communication protocol, the transmitting node including a host, a medium access controller (MAC), and a physical layer processor (PLP) and wherein one or more buffers include a first buffer coupled to receive data generated by the host and to provide the data generated by the host to the MAC, and a second buffer coupled to received data generated by the MAC and to provide data generated by the MAC to the PLP;
    determining one or more data transmission rates supported by one or more data transmission channels operating according to the first communication protocol, the one or more data transmission channels being used to communicate data between the transmitting node and a receiving node; and
    setting power consumption levels of one or more components in the transmitting node based on the data transmission rates supported by the transmitting node and the data transmission rates supported by the one or more channels utilizing one or more buffers as intermediate storage between components in the transmitting node.

12. The machine-readable medium of claim 11 wherein setting power consumption levels includes:
    determining whether a particular component has finished performing its corresponding function; and
    reducing power consumption level of the particular component if the particular component has finished performing its corresponding function.

13. The machine-readable medium of claim 12 wherein:
    if the data transmission rate of the host is greater than that of the one or more channels, reducing power consumption of the host after the host has finished writing data to the first buffer during a time interval in which the other components of the transmitting node processing the data stored in the first buffer.

14. The machine-readable medium of claim 13 wherein one or more host circuitry that is in idle state is reduced to a low power consumption (LPC) mode while the other components are processing the data stored in the first buffer.

15. The machine-readable medium of claim 12 wherein:
    if the data transmission rate of the host is less than that of the one or more channels, reducing power consumption of the other components after the other components have finished processing data generated by the host.

16. The machine-readable medium of claim 15 wherein the MAC and the PLP are switched to a lower power consumption (LPC) mode after the MAC and PLP have finished their corresponding functions and while the host buffer is being filled by the host.

* * * * *